US012649311B2

(12) United States Patent
Arimura et al.

(10) Patent No.: US 12,649,311 B2
(45) Date of Patent: Jun. 9, 2026

(54) LIQUID EJECTION DEVICE

(71) Applicant: SEIKO EPSON CORPORATION, Tokyo (JP)

(72) Inventors: Toshio Arimura, Shiojiri (JP); Jun Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 287 days.

(21) Appl. No.: 18/496,066

(22) Filed: Oct. 27, 2023

(65) Prior Publication Data

US 2024/0140098 A1 May 2, 2024

(30) Foreign Application Priority Data

Oct. 28, 2022 (JP) ................................ 2022-173071

(51) Int. Cl.
*B41J 2/165* (2006.01)

(52) U.S. Cl.
CPC ....... *B41J 2/16535* (2013.01); *B41J 2/16585* (2013.01); *B41J 2/16588* (2013.01); *B41J 2/16508* (2013.01); *B41J 2002/1655* (2013.01)

(58) Field of Classification Search
CPC ................ B41J 2/16535; B41J 2/16585; B41J 2/16588; B41J 2/16508; B41J 2002/1655
See application file for complete search history.

(56) References Cited

U.S. PATENT DOCUMENTS 8,696,088 B2 * 4/2014 Takada ................ B41J 2/16535
347/22
2014/0152740 A1 6/2014 Yoshino et al.

FOREIGN PATENT DOCUMENTS

JP 2014-108594 A 6/2014

* cited by examiner

*Primary Examiner* — Geoffrey S Mruk
(74) *Attorney, Agent, or Firm* — WORKMAN NYDEGGER

(57) ABSTRACT

A liquid ejection device includes an ejection section having multiple nozzle surfaces aligned in one direction and configured to eject liquid from nozzles that are opened on each of the multiple nozzle surfaces, and a wiping section that wipes the multiple nozzle surfaces, wherein the wiping section further including an absorbing member that absorbs the liquid clinging to the multiple nozzle surfaces by contacting the multiple nozzle surfaces, multiple pressing members that press the absorbing member against the multiple nozzle surfaces, and multiple elastic members that press each of the multiple pressing members toward the ejection section.

9 Claims, 11 Drawing Sheets

LIQUID EJECTION DEVICE

The present application is based on, and claims priority from JP Application Serial Number 2022-173071, filed Oct. 28, 2022, the disclosure of which is hereby incorporated by reference herein in its entirety.

BACKGROUND

1. Technical Field

The present disclosure relates to a liquid ejection device.

2. Related Art

JP-A-2014-108594 describes a liquid ejection device with an ejection section having multiple nozzle surfaces aligned in one direction and a wiping section that wipes the multiple nozzle surfaces. The wiping section has an absorbing member that contacts the nozzle surfaces. Liquid is removed from the nozzle surfaces as the absorbing member absorbs the liquid.

In such a liquid ejection device, the height of the nozzle surfaces may vary in the multiple nozzle surfaces. In other words, the distance between the wiping section and the nozzle surface may vary among the multiple nozzle surfaces. In this case, it is difficult for the absorbing member to make uniform contact with the multiple nozzle surfaces. Therefore, there is a possibility that the wiping section will not be able to wipe the multiple nozzle surfaces suitably.

SUMMARY

A liquid ejection device that solves the above problem includes an ejection section having multiple nozzle surfaces aligned in one direction and configured to eject liquid from nozzles that are opened in each of the multiple nozzle surfaces and a wiping section that wipes the multiple nozzle surfaces, wherein the wiping section has an absorbing member that absorbs the liquid clinging to the multiple nozzle surfaces by contacting the multiple nozzle surfaces, multiple pressing members that press the absorbing member against the multiple nozzle surfaces, and multiple elastic members configured to press each of the multiple pressing members toward the ejection section, wherein the multiple pressing members include a first pressing member and a second pressing member.

DESCRIPTION OF EMBODIMENTS

Hereinafter, an embodiment of a liquid ejection device will be described with reference to figures. The liquid ejection device is, for example, an inkjet printer that prints images such as text and photographs by ejecting ink, as an example of liquid, onto a medium such as paper or fabric.

1. Liquid Ejection Device

Figure 1:
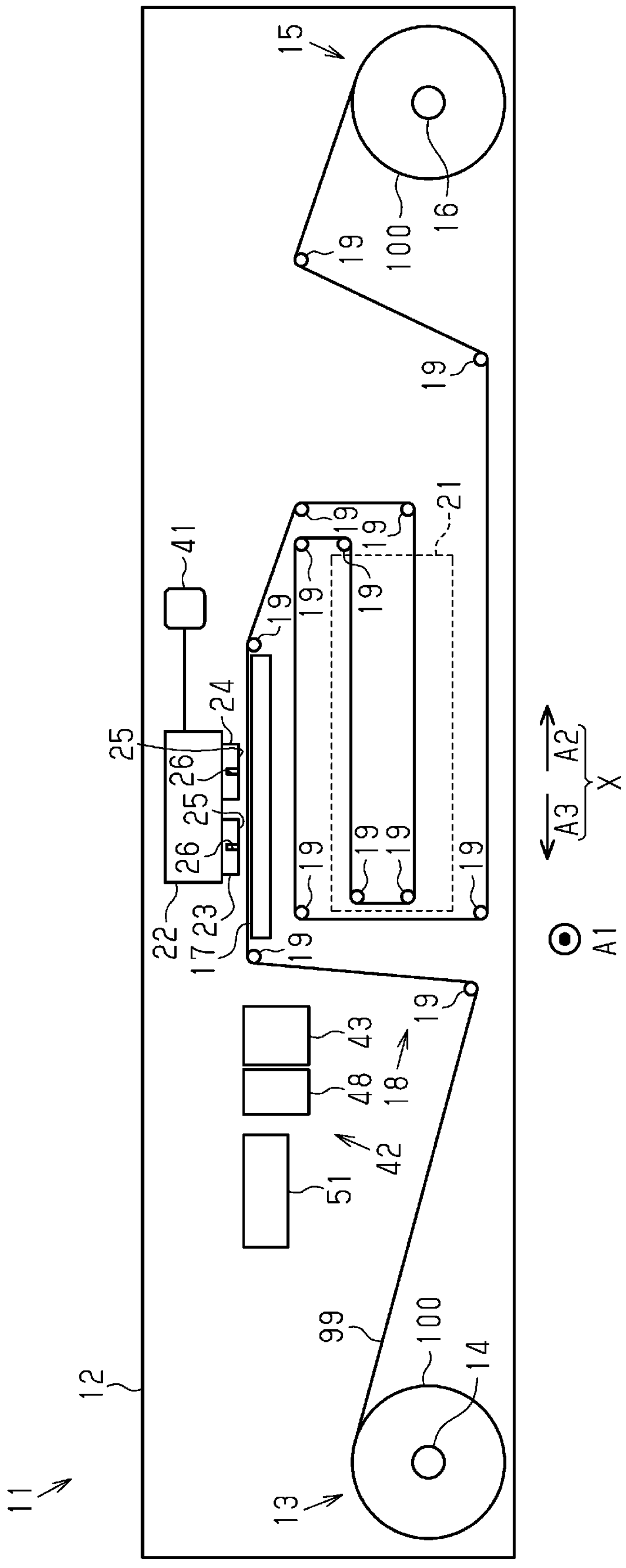
FIG. 1 is a side view showing an embodiment of a liquid ejection device.

As shown in FIG. 1, the liquid ejection device 11 has a housing 12. The liquid ejection device 11 has a feed-out section 13. The feed-out section 13 is configured to feed out a medium 99. The feed-out section 13 is housed in the housing 12, for example. The feed-out section 13 has a feed-out roller 14. The feed-out roller 14 rotatably holds a roll body 100 on which a medium 99 is wound and stacked. The feed-out roller 14 holds the medium 99 before printing. As the feed-out roller 14 rotates, the medium 99 is fed out from the feed-out section 13. The feed-out roller 14 may be driven and rotated by a motor, or it may be driven to rotate as the medium 99 is pulled.

The liquid ejection device 11 has a wind-up section 15. The wind-up section 15 is configured to wind up the medium 99. The wind-up section 15 is housed in the housing 12, for example. The wind-up section 15 has a wind-up roller 16. Similar to the feed-out roller 14, the wind-up roller 16 rotatably holds a roll body 100. The wind-up roller 16 holds the medium 99 after printing. As the wind-up roller 16 rotates, the wind-up section 15 winds up the medium 99. The wind-up roller 16 is driven and rotated by a motor, for example.

The liquid ejection device 11 has a support section 17. The support section 17 supports the medium 99. The support section 17 is housed in the housing 12, for example. For example, the support section 17 supports the medium 99 from below. The support section 17 supports the medium 99 during the process from the time the medium 99 is fed from the feed-out section 13 to the time the medium 99 is wound up in the wind-up section 15. The medium 99 is printed on a region of the medium 99 that is supported by the support section 17.

The liquid ejection device 11 has a transport section 18. The transport section 18 is configured to transport the medium 99. The transport section 18 is housed in the housing 12, for example. The transport section 18 transports the medium 99 from the feed-out section 13 toward the wind-up section 15. The transport section 18 intermittently transports the medium 99, for example. Specifically, the transport section 18 stops while liquid is ejected onto the region of medium 99 that is supported by the support section 17. The transport section 18 transports the medium 99 after the liquid has been ejected onto the region of the medium 99 that is supported by the support section 17. The transport section 18 may transport single-cut sheets of medium 99 as well as continuous long sheets of medium 99 from the roll body 100.

The transport section 18 has one or more transport rollers 19. The transport rollers 19 are located, for example, inside the housing 12. The transport rollers 19 transport the medium 99 by rotating. The medium 99 winds around the transport rollers 19. The transport rollers 19 may sandwich the medium 99. As the transport rollers 19 rotates, the medium 99 is transported. The transport rollers 19 include, for example, a roller driven and rotated by a motor. The transport rollers 19 form a transport path for the medium 99 in the housing 12.

The liquid ejection device 11 has a drying section 21. The drying section 21 is configured to dry the medium 99 after printing. The drying section 21 dries the medium 99 in the process of transporting the medium 99 from the support section 17 to the wind-up section 15. The drying section 21 is located, for example, inside the housing 12. For example, the drying section 21 is located directly below the support section 17. The drying section 21 is, for example, a drying furnace into which the medium 99 transported by the transport section 18 enters. The drying section 21 may include a heater that heats the medium 99. The drying section 21 may include a blower that blows gas onto the medium 99.

The liquid ejection device 11 has a carriage 22. The carriage 22 is configured to reciprocate in a scanning direction X. The carriage 22 moves reciprocally in the scanning direction X, thereby passing through a position facing the support section 17. The carriage 22 is located above the support section 17, for example.

In the liquid ejection device 11, the direction in which the carriage 22 moves coincide with the direction in which the medium 99 is transported on the support section 17. Therefore, the liquid ejection device 11 is a lateral printer. The liquid ejection device 11 may be a serial printer in which the medium 99 is transported in a direction different from the scanning direction X.

The liquid ejection device 11 has one or more ejection sections. The liquid ejection device 11 has, for example, a first ejection section 23 and a second ejection section 24. The liquid ejection device 11 may have three or more ejection sections. Each of the multiple ejection sections has a similar configuration. Therefore, the first ejection section 23 and the second ejection section 24 are described collectively as the ejection section.

The ejection section has multiple nozzle surfaces 25. The nozzle surface 25 is a surface through which one or more nozzles 26 are opened. The ejection section ejects liquid through the nozzle 26. In the ejection section, the multiple nozzle surfaces 25 are aligned in one direction. In detail, the multiple nozzle surfaces 25 are aligned on a first direction A1. The first direction A1 is a direction different from the scanning direction X.

The ejection section is mounted on the carriage 22. The multiple ejection sections are aligned in the scanning direction X. The scanning direction X includes a second direction A2 and a third direction A3. The third direction A3 is a direction opposite to the second direction A2. The second direction A2 is a direction in which the medium 99 is transported on the support section 17. The first ejection section 23 and the second ejection section 24 are aligned in this order in the second direction A2, for example. The ejection section prints an image on the medium 99 by ejecting liquid onto the medium 99. The multiple ejection sections may each eject the same type of liquid, or each eject a different type of liquid.

The ejection section ejects liquid onto the region of medium 99 that is supported by the support section 17. The ejection section is, for example, a line head that can eject liquid simultaneously over the width of the medium 99. The ejection section reciprocates with the carriage 22 in the scanning direction X. This allows the ejection section to eject liquid over the entire region of the medium 99 that is supported by the support section 17.

Figure 2:
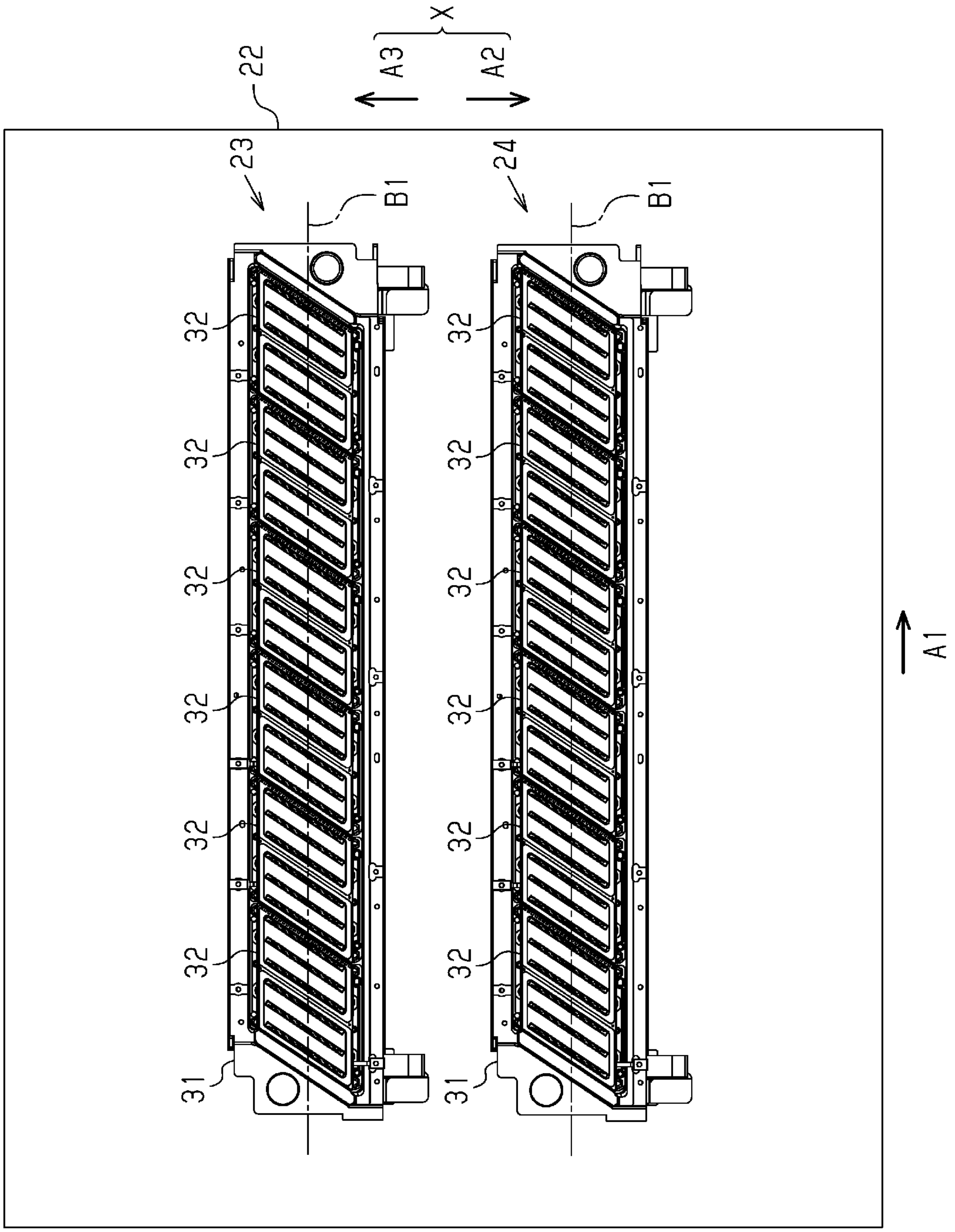
FIG. 2 is a bottom view showing an ejection section.
Figure 3:
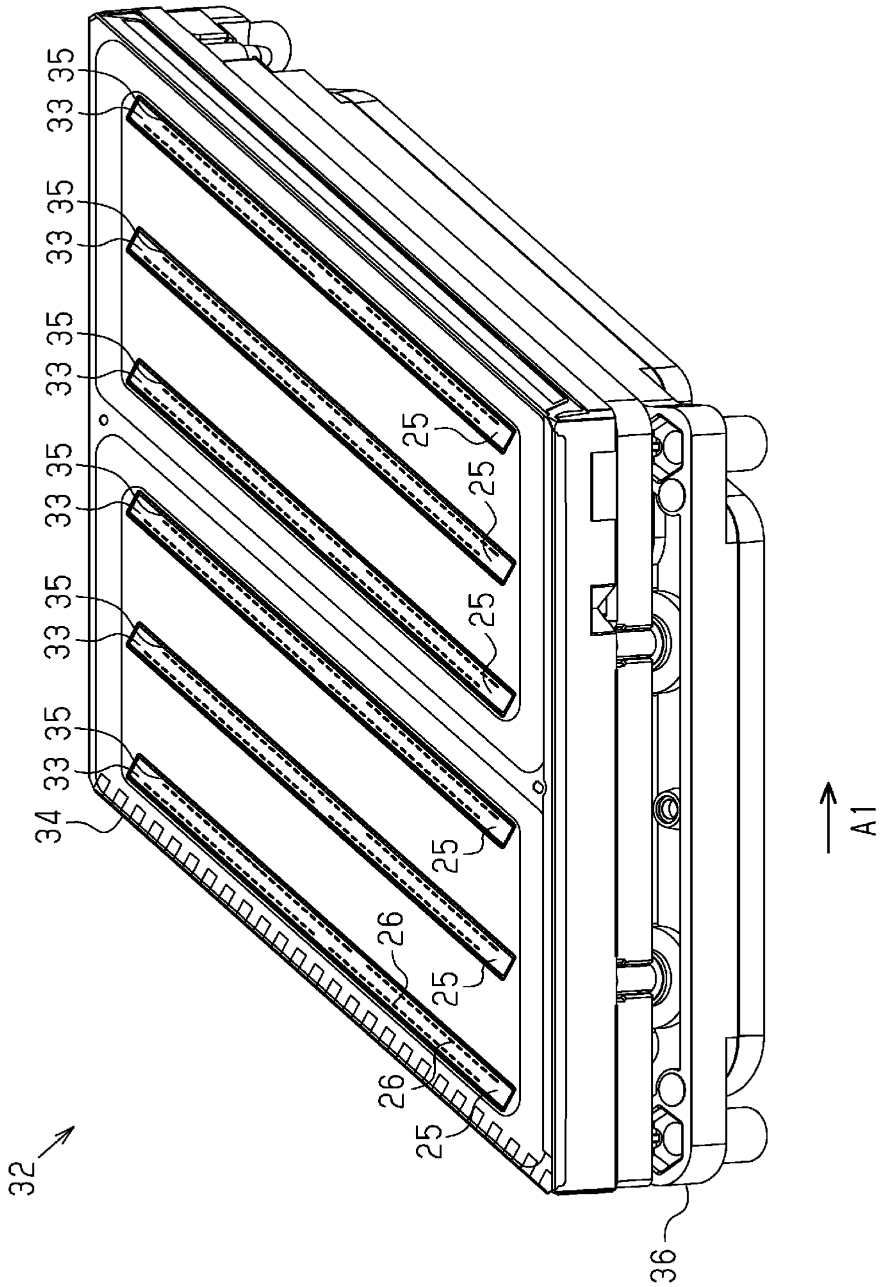
FIG. 3 is a perspective view showing the head unit.

As shown in FIGS. 2 and 3, the ejection section has a holder 31 and one or more head units 32. The holder 31 holds one or more head units 32. In one example, the holder 31 holds six head units 32. The holder 31 is attached to the carriage 22. The ejection section is mounted on the carriage 22 using the holder 31.

The head units 32 are attachable to and detachable from the holder 31. Therefore, the head units 32 are individually replaceable. Multiple head units 32 are aligned in one direction. In detail, the multiple head units 32 are aligned in the first direction A1.

A head unit 32 has one or more nozzle surfaces 25. In one example, a head unit 32 has six nozzle surfaces 25. On the nozzle surface 25, a nozzle array is formed by multiple nozzles 26 aligned in a row. In one example, two nozzle arrays are formed for each of the nozzle surfaces 25. Therefore, twelve nozzle arrays are formed in the head unit 32. In the head unit 32, the multiple nozzle arrays are aligned in one direction. More specifically, in the head units 32, the multiple nozzle arrays are aligned in the first direction A1. The nozzle arrays extend diagonally to, for example, the first direction A1, the second direction A2, and the third direction A3.

In one example, the head unit 32 can eject two types of liquid. The head unit 32 can eject different liquids at the nozzles 26 that are located on the second direction A2 side from the centerline B1 and at the nozzles 26 that are located on the third direction A3 side from the centerline B1. Thereby, the ejection section can eject two types of liquid. Therefore, the first ejection section 23 and the second ejection section 24 can eject a total of four types of liquid. The centerline B1 is an imaginary line that bisects the head unit 32 in the scanning direction X. That is, the centerline B1 extends in the first direction A1.

The head unit 32 has one or more head chips 33. In one example, the head unit 32 has six head chips 33. The head chip 33 has a nozzle surface 25. In the head chip 33, for example, two nozzle arrays are formed.

The head unit 32 has a fixing plate 34. The fixing plate 34 fixes the head chip 33. The fixing plate 34 is, for example, a metal plate. One or more exposure openings 35 are opened in the fixing plate 34. In one example, six exposure openings 35 are opened in the fixing plate 34. The head chips 33 are exposed through the exposure openings 35. In detail, the nozzle surface 25 and the nozzles 26 are exposed through the exposure opening 35.

The head unit 32 has a holding body 36. The holding body 36 holds the head chip 33 and the fixing plate 34. The holding body 36 holds the head chip 33 and the fixing plate 34 by the fixing plate 34 being attached to the holding body 36.

In the ejection section, the height of the multiple nozzle surfaces 25 may vary. This is due to the tolerance in the mounting of the head chip 33 to the holding body 36 and in the mounting of the head unit 32 to the holder 31. As a result, distance between a wiping section 48 (to be described later) and the nozzle surface 25 may vary between the multiple nozzle surfaces 25.

As shown in FIG. 1, the liquid ejection device 11 has a pressurizing section 41. The pressurizing section 41 is connected to the ejection section. The pressurizing section 41 is connected to, for example, the first ejection section 23 and the second ejection section 24. The pressurizing section 41 is configured to pressurize the inside of the ejection section. The pressurizing section 41, for example, pressurizes the first ejection section 23 and the second ejection section 24. The liquid ejection device 11 may have multiple pressurizing sections 41. For example, the liquid ejection device 11 may be provided with a pressurizing section 41 for each ejection section.

The pressurizing section 41 is, for example, a pump. The pressurizing section 41 pressurizes the inside of the ejection section and forces liquid out of the nozzle 26. In other words, the pressurizing section 41 pressurizes the inside of the ejection section to cause the ejection section to perform cleaning. The cleaning is a maintenance process that forces liquid out of the nozzles 26, thereby expelling air bubbles, foreign matter, and the like, from the nozzle 26 together with the liquid within the ejection section.

Figure 4:
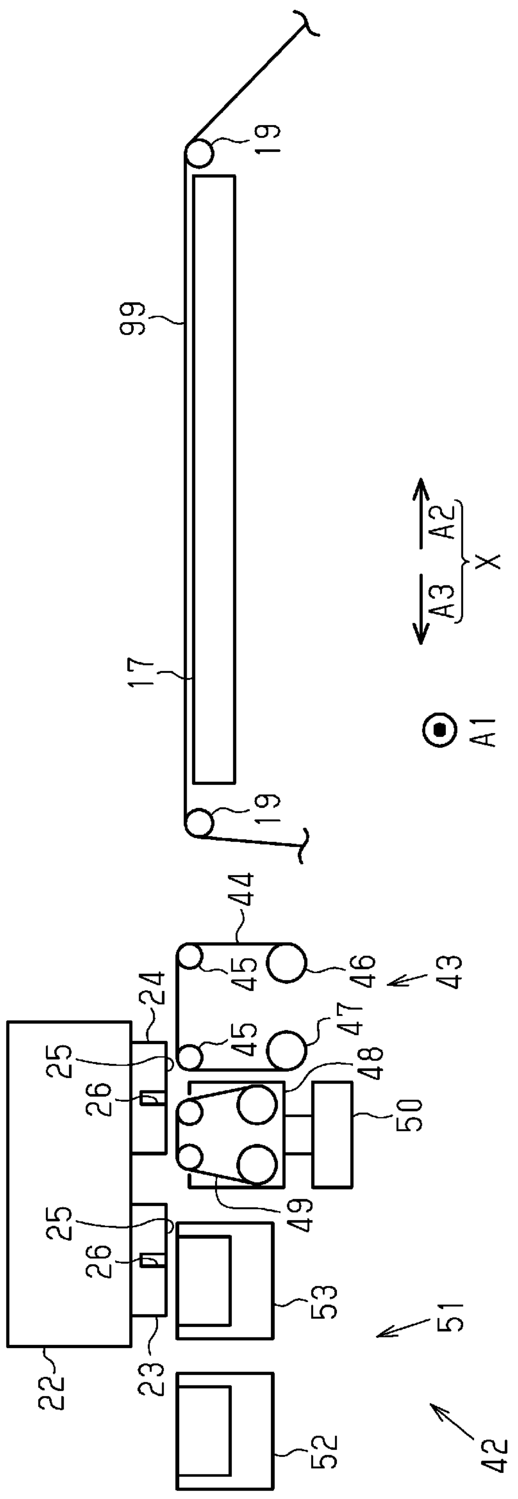
FIG. 4 is a side view showing a maintenance section.

As shown in FIG. 4, the liquid ejection device 11 has a maintenance section 42. The maintenance section 42 is configured to perform maintenance on the ejection section. In other words, the maintenance section 42 performs maintenance on the first ejection section 23 and the second ejection section 24.

The maintenance section 42 has a receiving section 43. The receiving section 43 is configured to receive the liquid ejected from the nozzles 26. In other words, the receiving section 43 receives the liquid ejected from the first ejection section 23. The receiving section 43 receives the liquid ejected from the second ejection section 24.

The receiving section 43 receives the liquid ejected from the nozzles 26 by performing maintenance. The receiving section 43 receives, for example, the liquid ejected from the nozzle 26 by cleaning. In this way, the receiving section 43 performs maintenance on the ejection section.

The receiving section 43 is not limited to cleaning, but also receives liquid ejected from the nozzles 26, for example, by flushing. The flushing is an operation of ejecting liquid from the nozzles 26 in order to suppress clogging of the nozzle 26. By the flushing, for example, the thickened liquid is ejected from the nozzle 26. The receiving section 43 performs maintenance on the ejection section by receiving liquid ejected by flushing.

The receiving section 43, for example, is aligned with the support section 17 in the scanning direction X. In one example, the receiving section 43 is located in the third direction A3 than the support section 17. The receiving section 43 receives liquid ejected from the ejection section facing the receiving section 43. In other words, when the first ejection section 23 is positioned facing the receiving section 43, the receiving section 43 receives the liquid ejected from the first ejection section 23. In this way, the receiving section 43 performs maintenance on the first ejection section 23. When the second ejection section 24 is positioned facing the receiving section 43, the receiving section 43 receives the liquid ejected from the second ejection section 24. In this way, the receiving section 43 performs maintenance on the second ejection section 24.

The receiving section 43 has a receiving member 44. The receiving member 44 is a member that receives liquid. The receiving member 44 is, for example, fabric. Therefore, the receiving member 44 receives the liquid ejected from the nozzles 26 and also absorbs the liquid.

The receiving section 43 may have two holding rollers 45. The receiving member 44 is wound around the two holding rollers 45. In other words, the receiving member 44 is suspended on the two holding rollers 45. In this way, the two holding rollers 45 hold the receiving member 44. The two holding rollers 45 hold the receiving member 44, thereby forming a region in the receiving member 44 that is facing the nozzle surface 25. The receiving member 44 receives liquid in this region.

The receiving section 43 may have a supply roller 46 and a collection roller 47. The supply roller 46 is a roller for supplying the unused receiving member 44. The collection roller 47 is a roller for collecting the used receiving member 44. For example, each time the receiving member 44 receives a certain amount of liquid, the supply roller 46 and the collection roller 47 rotate.

The receiving member 44 may be a box for receiving liquid. In this case, the receiving section 43 does not need to have the holding roller 45, the supply roller 46, and the collection roller 47. The receiving section 43 may have a waste liquid recovery body that collects the liquid received by the receiving member 44.

The maintenance section 42 has the wiping section 48. The wiping section 48 is configured to wipe the multiple nozzle surfaces 25. The wiping section 48 wipes the nozzle surface 25 by contacting the nozzle surface 25. The wiping section 48 contacts the nozzle surface 25 of the first ejection section 23 to wipe that nozzle surface 25. The wiping section 48 contacts the nozzle surface 25 of the second ejection section 24 to wipe that nozzle surface 25. The wiping section 48 wipes the nozzle surface 25 to remove liquid clinging to the nozzle surface 25. In other words, the wiping section 48 performs wiping for the ejection section. In this way, the wiping section 48 performs maintenance on the ejection section.

The wiping section 48, for example, wipes the nozzle surface 25 after the cleaning. When the cleaning is performed, liquid clings to the nozzle surface 25 as liquid is ejected from the nozzles 26. Therefore, it is recommended that the wiping section 48 wipes the nozzle surface 25 after the cleaning. In this way, the liquid clinging to the nozzle surface 25 is removed.

The wiping section 48, for example, is aligned with the receiving section 43 in the scanning direction X. In one example, the wiping section 48 is located in the third direction A3 than the receiving section 43. The wiping section 48 comes into contact with the ejection section that is facing the wiping section 48. In other words, the wiping section 48 comes into contact with the ejection section located directly above it.

The wiping section 48 wipes the nozzle surface 25 by moving relative to the ejection section while in contact with the nozzle surface 25. For example, the wiping section 48 wipes the nozzle surface 25 as the carriage 22 moves. In detail, the wiping section 48 wipes the nozzle surface 25 as the carriage 22 moves in the third direction A3 while contacting the nozzle surface 25. Thereby, the wiping section 48 can smoothly wipe the nozzle surface 25 after the ejection section ejects liquid into the receiving section 43.

The wiping section 48 has an absorbing member 49. The absorbing member 49 is a member that absorbs liquid that clings to the multiple nozzle surfaces 25, by contacting the multiple nozzle surfaces 25. The absorbing member 49 is, for example, fabric. The absorbing member 49 wipes the multiple nozzle surfaces 25, thereby removing liquid from the multiple nozzle surfaces 25. The detailed configuration of the wiping section 48 will be described again later.

The maintenance section 42 has a movement mechanism 50. The movement mechanism 50 is a mechanism for moving the wiping section 48. In detail, the movement mechanism 50 moves the wiping section 48 closer to and away from the ejection section. In other words, the movement mechanism 50 moves the wiping section 48 so as to decrease or increase the distance between the ejection section facing the wiping section 48 and the wiping section 48.

The movement mechanism 50 raises and lowers the wiping section 48, for example. The movement mechanism 50 is, for example, an air cylinder.

The movement mechanism 50 moves the wiping section 48 between a standby position and a wipe position. The wipe position is a position where the wiping section 48 is in contact with the ejection section that faces the wiping section 48. The standby position is a position where the wiping section 48 does not contact the ejection section that faces the wiping section 48. When the wiping section 48 is in the standby position, the wiping section 48 does not contact the nozzle surface 25 of the ejection section that passes above the wiping section 48. This reduces a possibility of the wiping section 48 needlessly contacting the nozzle surface 25. Therefore, wear of the nozzle surface 25 is reduced. The ejection section may approach the wiping section 48, so that the wiping section 48 may contact the nozzle surface 25. In this case, the ejection section is raised and lowered.

The maintenance section 42 has a cap section 51. The cap section 51 is configured to form a space that connects to the nozzle 26 by contacting the ejection section. The cap section 51, for example, forms a space that connects to the nozzle 26 by contacting the nozzle surface 25 or the fixing plate 34. The cap section 51 keeps its nozzle 26 moist by contacting the first ejection section 23. The cap section 51 keeps its nozzle 26 moist by contacting the second ejection section 24. This reduces the possibility of clogging of the nozzle 26.

The cap section 51 has one or more caps. The cap section 51 has, for example, a first cap 52 and a second cap 53. The first cap 52 forms a space that connects to the nozzle 26 by contacting the first ejection section 23. In other words, the first cap 52 performs capping for the first ejection section 23. This keeps the nozzles 26 of the first ejection section 23 moist. The second cap 53 forms a space that connect to the nozzle 26 by contacting the second ejection section 24. In other words, the second cap 53 performs capping for the second ejection section 24. This keeps the nozzle 26 of the second ejection section 24 moist. In this way, the cap section 51 maintains the ejection section by keeping the nozzle 26 moist.

The cap section 51, for example, is aligned with the wiping section 48 in the scanning direction X. In one example, the cap section 51 is located further in the third direction A3 than is the wiping section 48. Therefore, the cap section 51, the wiping section 48, and the receiving section 43 are aligned in this order in the second direction A2. In this way, the cap section 51 can smoothly cap the ejection section after the wiping section 48 wipes the nozzle surface 25. The first cap 52 is located further in the third direction A3 than is the second cap 53.

For example, when the ejection section is positioned facing the cap section 51, the cap section 51 contacts the nozzle surface 25 by approaching the ejection section. In other words, when the first ejection section 23 is positioned facing the first cap 52, the first cap 52 contacts the nozzle surface 25 by approaching the first ejection section 23. When the second ejection section 24 is positioned facing the second cap 53, the second cap 53 contacts the nozzle surface 25 by approaching the second ejection section 24. The cap section 51 may contact the nozzle surface 25 by the ejection section approaching the cap section 51. The maintenance section 42 may have a movement mechanism for moving the cap section 51, similar to the wiping section 48.

When the first ejection section 23 and the second ejection section 24 are in standby, the first cap 52 and the second cap 53 cap the first ejection section 23 and the second ejection section 24, respectively. In other words, the first cap 52 and the second cap 53 cap the first ejection section 23 and the second ejection section 24, respectively, when the first ejection section 23 and the second ejection section 24 are not printing, for example, when the first ejection section 23 and the second ejection section 24 are waiting for print data to be input, and when the power of the liquid ejection device 11 is off.

2. Wiping Section

Figure 5:
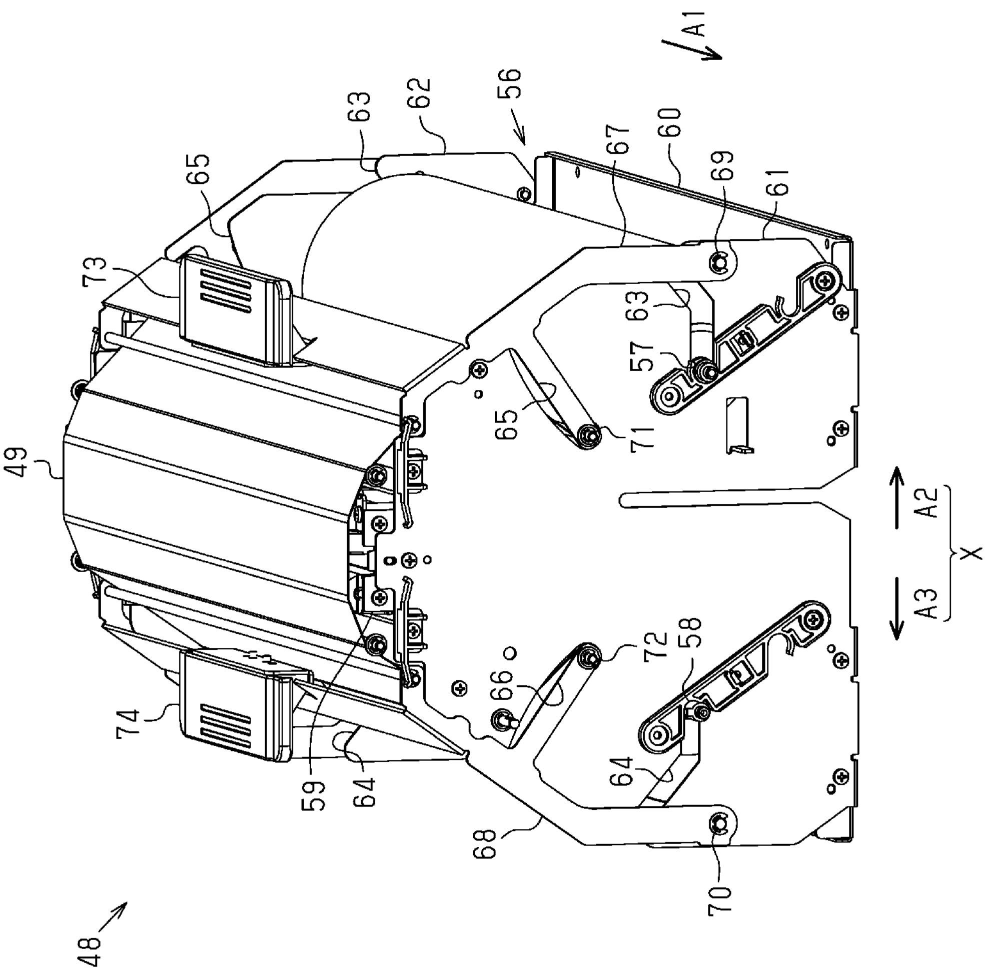
FIG. 5 is a perspective view showing a wiping section.
Figure 6:
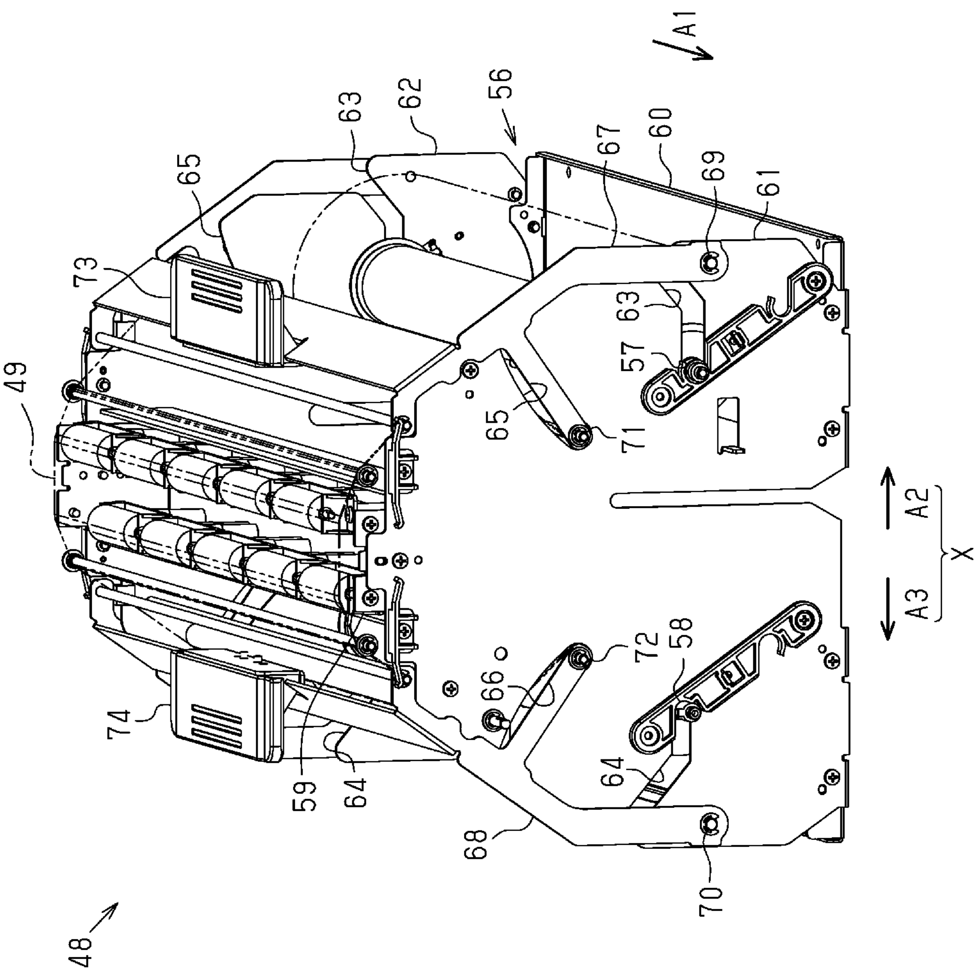
FIG. 6 is a perspective view of FIG. 5, showing an absorbing member as transparent.

Next, an example of the wiping section 48 will be described in detail. As shown in FIGS. 5 and 6, the wiping section 48 has a mounting frame 56, a feed-out shaft 57, a wind-up shaft 58, and a pressing section 59.

The mounting frame 56 is a frame to which the feed-out shaft 57, the wind-up shaft 58, and the pressing section 59 are attached. The mounting frame 56 includes a bottom plate 60, a first attachment plate 61, and a second attachment plate 62. The bottom plate 60 connects the first attachment plate 61 and the second attachment plate 62. The first attachment plate 61 and the second attachment plate 62 face each other in the first direction A1. The first attachment plate 61 and the second attachment plate 62 extend perpendicular from the bottom plate 60. The feed-out shaft 57, the wind-up shaft 58, and the pressing section 59 are attached to the first attachment plate 61 and the second attachment plate 62. For example, the feed-out shaft 57, the wind-up shaft 58, and the pressing section 59 span between the first attachment plate 61 and the second attachment plate 62.

The first attachment plate 61 has a feed-out groove 63 and a wind-up groove 64. Similarly, the second attachment plate 62 has a feed-out groove 63 and a wind-up groove 64. The two feed-out grooves 63 are formed by cutting notches in both the first attachment plate 61 and the second attachment plate 62. The feed-out shaft 57 is supported by the first attachment plate 61 and the second attachment plate 62 by inserting the ends of the feed-out shaft 57 into the two feed-out grooves 63. In this way, the feed-out shaft 57 is attached to the first attachment plate 61 and the second attachment plate 62. The two wind-up grooves 64 are formed by cutting notches in both the first attachment plate 61 and the second attachment plate 62. The wind-up shaft 58 is supported by the first attachment plate 61 and the second attachment plate 62 by inserting the ends of the wind-up shaft 58 into the two wind-up grooves 64. In this way, the wind-up shaft 58 is attached to the first attachment plate 61 and the second attachment plate 62.

A first guide groove 65 may be formed in the first attachment plate 61. Similarly, a first guide groove 65 may also formed in the second attachment plate 62. The two first guide grooves 65 are formed by cutting notches in both the first attachment plate 61 and the second attachment plate 62. The first guide groove 65 is a groove that guides rotation of a first protection plate 67 (to be described later).

A second guide groove 66 may be formed in the first attachment plate 61. Similarly, a second guide groove 66 may be formed in the second attachment plate 62. The two second guide grooves 66 are formed by cutting notches in both the second attachment plate 61 and the second attachment plate 62. The second guide groove 66 is a groove that guides the rotation of a second protection plate 68 (to be described later).

The mounting frame 56 may include the first protection plate 67 and the second protection plate 68. The first protection plate 67 is a member that prevents the feed-out shaft 57 from disengaging from the feed-out groove 63. The second protection plate 68 is a member that prevents the wind-up shaft 58 from disengaging from the wind-up groove 64.

The first protection plate 67 has first rotation shafts 69. The first protection plate 67 can rotate around the first rotation shafts 69. The first protection plate 67 is attached to the first attachment plate 61 and to the second attachment plate 62 via the first rotation shafts 69. The first protection plate 67, for example, spans between the first attachment plate 61 and the second attachment plate 62.

The second protection plate 68 has second rotation shafts 70. The second protection plate 68 can rotate around the second rotation shafts 70. The second protection plate 68 is attached to the first attachment plate 61 and the second attachment plate 62 via the second rotation shafts 70. The second protection plate 68, for example, spans between the first attachment plate 61 and the second attachment plate 62.

The first protection plate 67 has first guide shafts 71. The first guide shafts 71 are inserted into the first guide grooves 65. When the first protection plate 67 rotates, the first guide shafts 71 move along the first guide grooves 65.

The second protection plate 68 has second guide shafts 72. The second guide shafts 72 are inserted into the second guide grooves 66. When the second protection plate 68 rotates, the second guide shafts 72 move along the second guide grooves 66.

When the first protection plate 67 and the second protection plate 68 are closed, the first guide shafts 71 and the second guide shafts 72 fit into the first guide grooves 65 and the second guide grooves 66, respectively. In this case, the first protection plate 67 covers a part of the feed-out groove 63. The second protection plate 68 covers a part of the wind-up groove 64. This configuration suppresses the disengagement of the feed-out shaft 57 from the feed-out grooves 63 and the disengagement of the wind-up shaft 58 from the wind-up grooves 64. In FIGS. 5 and 6, the first protection plate 67 and the second protection plate 68 are closed.

When the first protection plate 67 and the second protection plate 68 are opened, the first guide shafts 71 and the second guide shafts 72 disengage from the first guide grooves 65 and the second guide grooves 66, respectively. In this case, the first protection plate 67 does not cover the feed-out grooves 63. The second protection plate 68 does not cover the wind-up grooves 64. Therefore, it is possible to remove the feed-out shaft 57 from the feed-out grooves 63 and the wind-up shaft 58 from the wind-up grooves 64.

The first protection plate 67 may have a first grip section 73. The second protection plate 68 may have a second grip section 74. When the user pulls on the first grip section 73 and the second grip section 74 so that the distance between the first grip section 73 and the second grip section 74 increases, the first protection plate 67 and the second protection plate 68 open. Thus, the first grip section 73 and the second grip section 74 make the user's operation of the first protection plate 67 and the second protection plate 68 easier to perform.

Unused absorbing member 49 is wound over the feed-out shaft 57. The feed-out shaft 57 rotates to feed out the unused absorbing member 49. Used absorbing member 49 is wound over the wind-up shaft 58. The wind-up shaft 58 rotates to wind up the used absorbing member 49. For example, each time the absorbing member 49 wipes the nozzle surfaces 25 a predetermined number of times, the feed-out shaft 57 and the wind-up shaft 58 rotate. The user can replace the absorbing member 49 by detaching the feed-out shaft 57 and the wind-up shaft 58 from the mounting frame 56.

The pressing section 59 is configured to press the absorbing member 49 against the multiple nozzle surfaces 25. The absorbing member 49 is wound around the pressing section 59. As the pressing section 59 presses the absorbing member 49 against the nozzle surfaces 25, the absorbing member 49 can intimately contact the nozzle surfaces 25.

Figure 7:
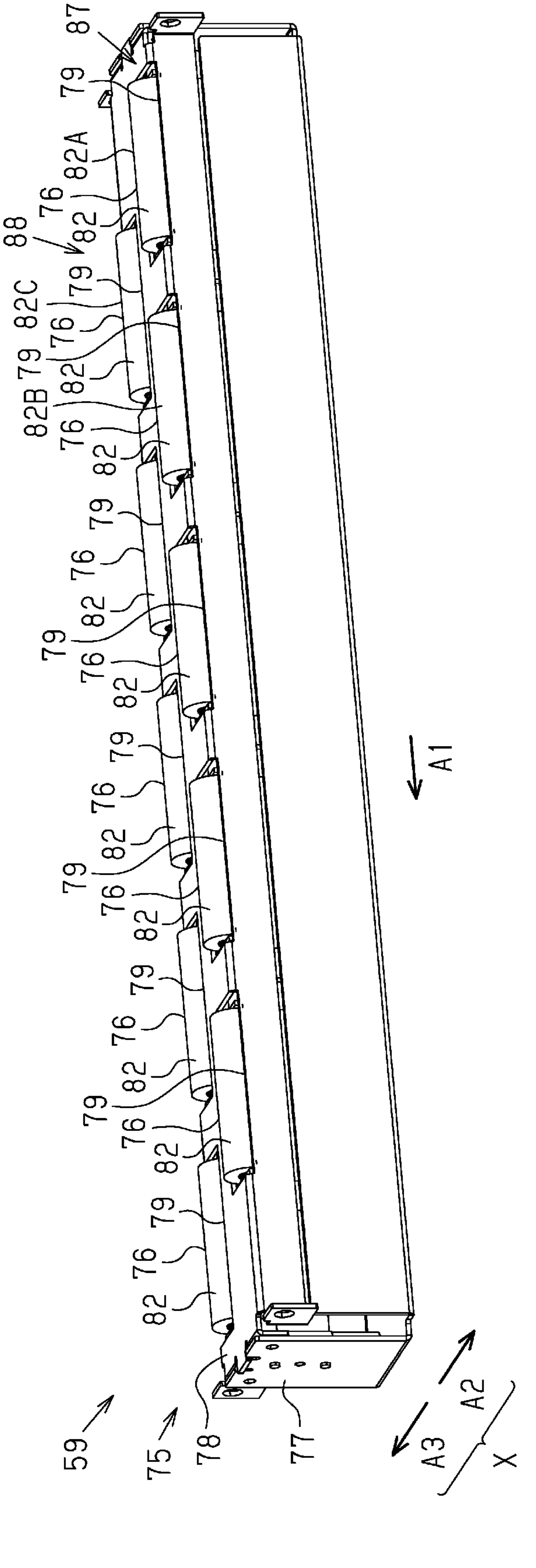
FIG. 7 is a perspective view of a pressing section.
Figure 8:
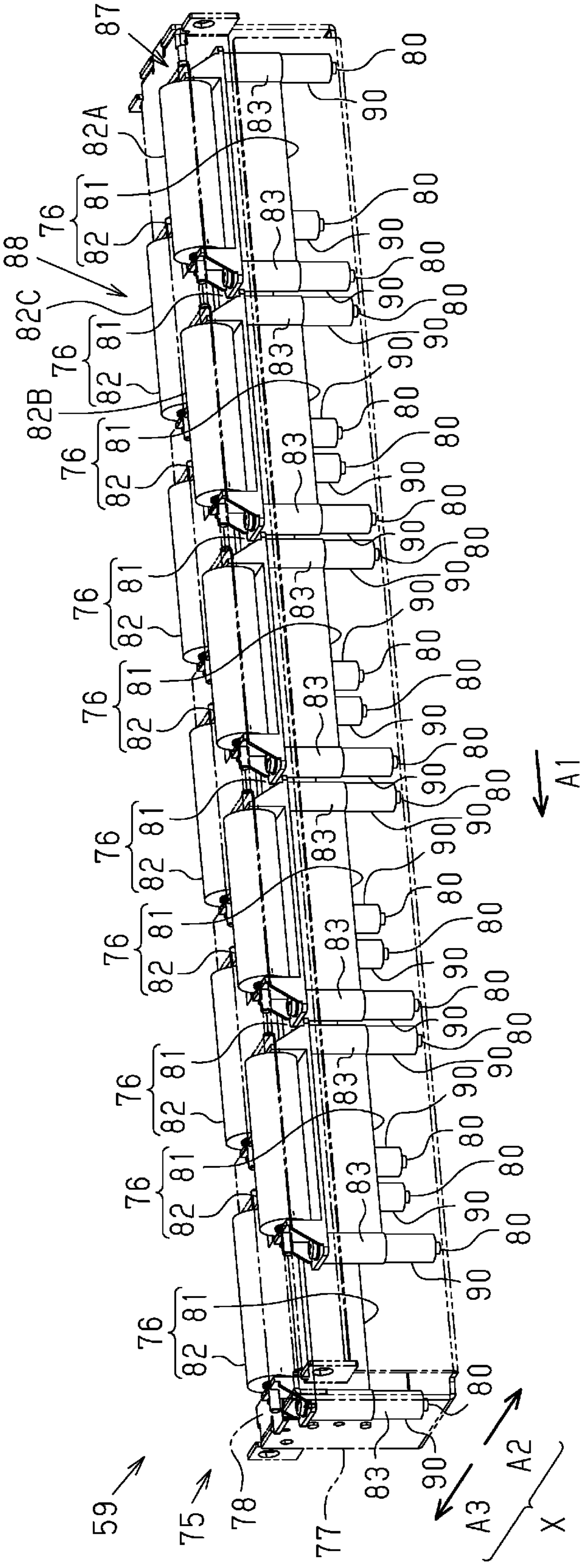
FIG. 8 is a perspective view of FIG. 7, showing a holding member as transparent.
Figure 9:
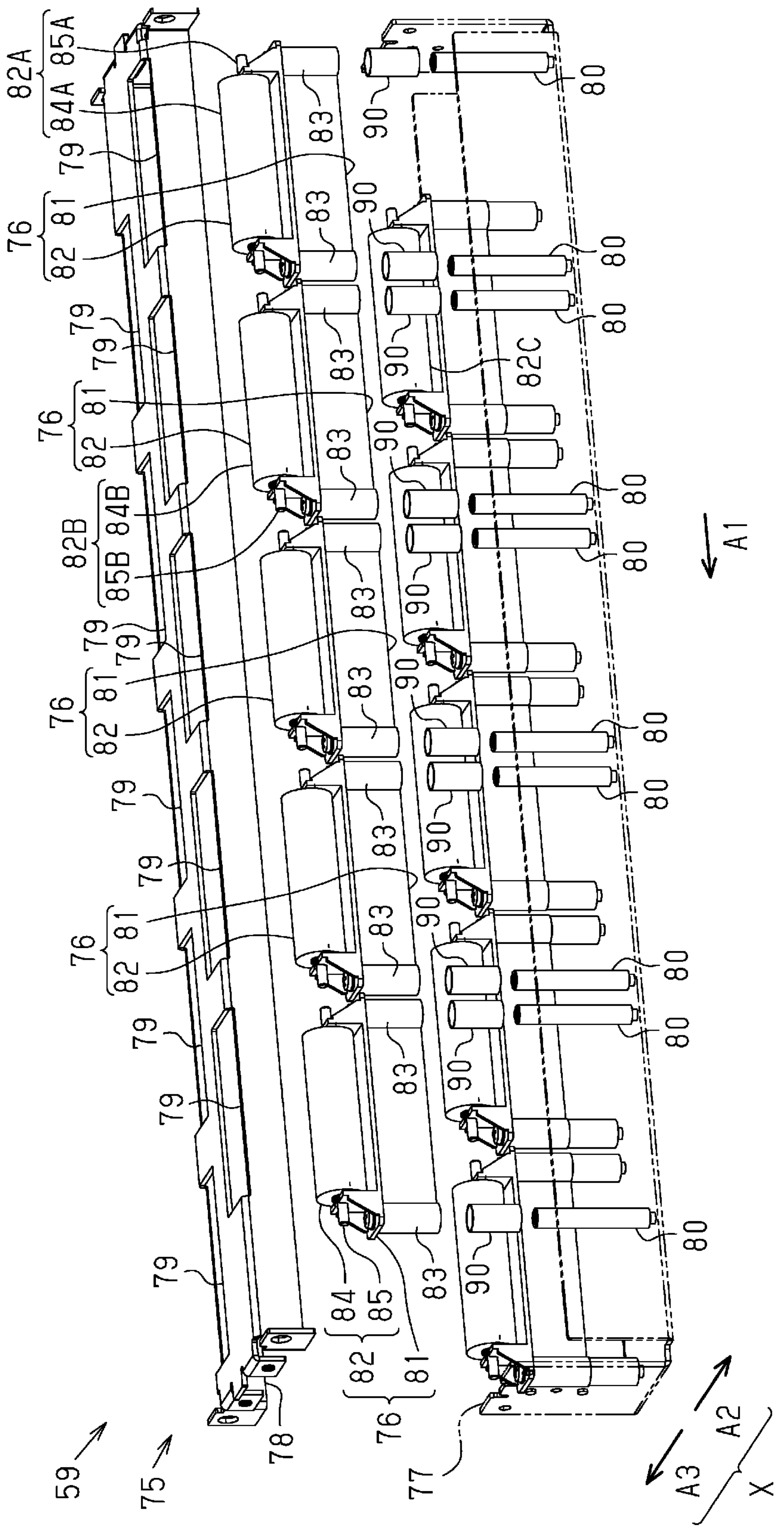
FIG. 9 is an exploded perspective view of the pressing section.

As shown in FIGS. 7, 8, and 9, the pressing section 59 has a holding member 75 and a plurality of pressing units 76. In one example, the pressing section 59 has a holding member 75 and ten pressing units 76.

The holding member 75 is a member that holds the multiple pressing units 76. The holding member 75 has a holding portion 77 and a cover portion 78. The holding portion 77 surrounds the multiple pressing units 76. The cover portion 78 is attached to the holding portion 77. By this, a holding space for the multiple pressing units 76 is formed inside the holding portion 77 and the cover portion 78. The cover portion 78 has multiple through openings 79. The multiple through openings 79 correspond to the multiple pressing units 76. The holding member 75 holds the multiple pressing units 76 so that a portion of each pressing unit 76 protrudes from the corresponding through opening 79.

The holding member 75 has multiple insertion shafts 80. The insertion shafts 80 are shafts that are inserted into the pressing units 76. In one example, two insertion shafts 80 are inserted for one pressing unit 76. Therefore, the holding member 75 has 20 insertion shafts 80. The insertion shafts 80 extend from the holding portion 77. In detail, the insertion shafts 80 extend from a bottom surface of the holding portion 77.

The pressing unit 76 has an attachment member 81 and a pressing member 82. The attachment member 81 is a member to which the pressing member 82 is attached. The attachment member 81 has one or more insertion cylinders 83. In one example, the attachment member 81 has two insertion cylinders 83. The two insertion cylinders 83 are located at either end of the attachment member 81 in the first direction A1. The insertion cylinders 83 open toward the bottom of the holding portion 77. The insertion shaft 80 is inserted into the insertion cylinder 83. This holds the pressing unit 76 in the holding member 75. The insertion of two insertion shafts 80 for one attachment member 81 makes the posture of the pressing unit 76 more stable than when only one insertion shaft 80 is inserted.

The pressing member 82 is a member that presses the absorbing member 49 against the multiple nozzle surfaces 25. In detail, the pressing member 82 presses the absorbing member 49, which is fed out from the feed-out shaft 57, against the multiple nozzle surfaces 25.

The pressing member 82 is, for example, a rotatable roller. Therefore, the absorbing member 49 can easily move from the feed-out shaft 57 to the wind-up shaft 58. In one example, the shaft portion 85 is a portion that is inserted into the cylindrical portion 84. The shaft portion 85 is attached to the attachment member 81. The shaft portion 85 extends, for example, in the first direction A1. The pressing member 82 is composed of a roller, which makes it is easier to bring the absorbing member 49 into intimate contact with the nozzle surface 25. This makes it easier to wipe off liquid clinging to the nozzle surface 25. The cylindrical portion 84 may be made of an elastic material such as sponge, rubber, or the like. In this case, the absorbing member 49 can more easily brought into intimate contact with the nozzle surface 25.

Multiple shaft portions 85 are each attached to a different attachment member 81. Thus, each of the multiple shaft portions 85 can tilt at different angles. Therefore, when wiping the multiple nozzle surfaces 25, the multiple cylindrical portions 84 can each tilt to match the nozzle surface 25. This makes it easier for the absorbing member 49 to intimately contact to the nozzle surface 25.

The multiple pressing members 82 include a first pressing member 82A and a second pressing member 82B. The first pressing member 82A and the second pressing member 82B are two pressing members 82 aligned in the first direction A1. The first pressing member 82A and the second pressing member 82B are adjacent to each other in the first direction A1. Each of the first pressing member 82A and the second pressing member 82B presses the absorbing member 49 against the multiple nozzle surfaces 25. This enables the absorbing member 49 to contact the multiple nozzle surfaces 25 uniformly, even when heights of multiple nozzle surfaces 25 vary. Therefore, the wiping section 48 can suitably contact the multiple nozzle surfaces 25. If the absorbing member 49 is pressed against the multiple nozzle surfaces 25 with one long pressing member 82, the load applied to the absorbing member 49 will be different on each of the nozzle surfaces 25 if there are variations in height on the multiple nozzle surfaces 25. As a result, there is a possibility that the absorbing member 49 will not be able to contact the multiple nozzle surfaces 25 uniformly, and the liquid will not be removed correctly.

The first pressing member 82A has a first cylindrical portion 84A and a first shaft portion 85A. The second pressing member 82B has a second cylindrical portion 84B and a second shaft portion 85B. As described above, the first shaft portion 85A and the second shaft portion 85B can tilt to different angles from each other. Therefore, the first cylindrical portion 84A and the second cylindrical portion 84B can each tilt to match the nozzle surfaces 25 while wiping the multiple nozzle surfaces 25. This makes it easier for the absorbing member 49 to intimately contact to the nozzle surface 25.

The multiple pressing members 82 may include a third pressing member 82C. The third pressing member 82C has a third cylindrical portion and a third shaft portion. The third pressing member 82C is a pressing member 82 located at a position that does not overlap the first pressing member 82A and the second pressing member 82B as viewed from the first direction A1. At least a part of the third pressing member 82C is located between the first pressing member 82A and the second pressing member 82B as viewed from the second direction A2. The entire third pressing member 82C may be positioned between the first pressing member 82A and the second pressing member 82B as viewed from the second direction A2. Therefore, the first pressing member 82A, the second pressing member 82B, and the third pressing member 82C are positioned alternately.

In the first direction A1, a gap is formed between the first pressing member 82A and the second pressing member 82B. Depending on the positional relationship between the ejection section and the wiping section 48, there may be a region amongst the multiple nozzle surfaces 25 that overlaps this gap. In this case, the first pressing member 82A and the second pressing member 82B cannot press the absorbing member 49 against the region of the nozzle surface 25 that overlaps this gap. In contrast, the third pressing member 82C can press the absorbing member 49 against the region of the nozzle surface 25 that overlaps this gap. Therefore, the wiping section 48 can suitably wipe the multiple nozzle surfaces 25.

The third pressing member 82C is located, as viewed from the second direction A2, in a position overlapping the first pressing member 82A and overlapping the second pressing member 82B. In other words, the third pressing member 82C may overlap the first pressing member 82A and the second pressing member 82B as viewed from the second direction A2. A portion of the third pressing member 82C may overlap the first pressing member 82A and the second pressing member 82B as viewed from the second direction A2. In one example, one end portion of the third pressing member 82C overlaps the first pressing member 82A as viewed from the second direction A2. The other end portion of the third pressing member 82C overlaps the second pressing member 82B as viewed from the second direction A2. As a result, some regions of the multiple nozzle surfaces 25 are wiped twice by the first pressing member 82A and the third pressing member 82C. Some regions of the multiple nozzle surfaces 25 are wiped twice by the second pressing member 82B and the third pressing member 82C. Therefore, the liquid clinging to the nozzle surface 25 is more reliably removed.

The multiple pressing members 82, including the first pressing member 82A, the second pressing member 82B, and the third pressing member 82C, comprise an upstream pressing body 87 and a downstream pressing body 88. The first pressing member 82A and the second pressing member 82B constitute one of the upstream pressing body 87 and the downstream pressing body 88. The third pressing member 82C constitutes the other of the upstream pressing body 87 and the downstream pressing body 88.

At least one of the upstream pressing body 87 and the downstream pressing body 88 is composed of the multiple pressing members 82 aligned in one direction. In other words, any one of the upstream pressing body 87 and the downstream pressing body 88 may be composed of one pressing member 82. In one example, both the upstream pressing body 87 and the downstream pressing body 88 are each composed of multiple pressing members 82 aligned in the first direction A1. The upstream pressing body 87 includes, for example, the first pressing member 82A and the second pressing member 82B. The downstream pressing body 88 includes, for example, the third pressing member 82C.

In the upstream pressing body 87, the multiple pressing members 82 are arranged at equal intervals in the first direction A1. In one example, in the upstream pressing body 87, five pressing members 82 are aligned at equal intervals in the first direction A1. In other words, in the upstream pressing body 87, the three pressing members 82 are aligned in the first direction A1 together with the first pressing member 82A and the second pressing member 82B. The upstream pressing body 87 is located further in the second direction A2 than is the downstream pressing body 88. Therefore, when the wiping section 48 wipes the nozzle surface 25, the upstream pressing body 87 presses the absorbing member 49 against the nozzle surface 25 before the downstream pressing body 88 does.

In the downstream pressing body 88, the multiple pressing members 82 are aligned at equal intervals in the first direction A1. In one example, in the downstream pressing body 88, five pressing members 82 are aligned at equal intervals in the first direction A1, similarly to the upstream pressing body 87. In other words, in the downstream pressing body 88, the four pressing members 82 are aligned in the first direction A1 together with the third pressing member 82C.

In the upstream pressing body 87 and the downstream pressing body 88, the multiple pressing members 82 are aligned alternately. Therefore, the positions in the first direction A1 of the pressing members 82 comprising the downstream pressing body 88 are displaced with respect to the positions of the pressing members 82 comprising the upstream pressing body 87. In other words, as viewed from the second direction A2, at least a portion of the pressing members 82 comprising the downstream pressing body 88 does not overlap with the pressing members 82 comprising the upstream pressing body 87. As a result, the wiping section 48 can wipe the entire area against the multiple nozzle surfaces 25. Further, as viewed from the second direction A2, a portion of the pressing members 82 comprising the downstream pressing body 88 may overlap with the pressing members 82 comprising the upstream pressing body 87.

The pressing section 59 has multiple elastic members 90. The multiple elastic members 90 press each of the multiple pressing members 82 toward the ejection section. The elastic member 90 is, for example, a spring. Each of the multiple elastic members 90 is inserted into the multiple insertion shafts 80. Thus, the pressing section 59 has 20 elastic members 90. The elastic member 90 is sandwiched between the attachment member 81 and the holding portion 77. In detail, the elastic member 90 is sandwiched between the insertion cylinder 83 and the bottom surface of the holding portion 77. Therefore, the elastic member 90 presses the attachment member 81 along the insertion shaft 80 toward the ejection section. The elastic member 90 pushes the pressing member 82 toward the ejection section by pushing against the attachment member 81. As a result, the pressing member 82 presses the absorbing member 49 against the multiple nozzle surface 25.

By pressing each of the multiple pressing members 82 against the multiple nozzle surfaces 25 using different elastic members 90, the absorbing member 49 can uniformly contact the multiple nozzle surfaces 25, even when heights of the nozzle surfaces 25 vary. Therefore, the wiping section 48 can suitably wipe the multiple nozzle surfaces 25. If the multiple pressing members 82 are pressed against the multiple nozzle surfaces 25 by a common elastic member 90, the load applied to the absorbing member 49 will be different for each nozzle surface 25 if there are variations in the height of the nozzle surfaces 25. As a result, there is a possibility that the absorbing member 49 will not be able to contact the multiple nozzle surfaces 25 uniformly, and the liquid will not be removed correctly.

3. Wiping Operation

Next, a wiping operation of the nozzle surface 25 by the wiping section 48 will be described. In the wiping operation, the wiping section 48 wipes the nozzle surface 25 of the first ejection section 23 and the nozzle surface 25 of the second ejection section 24.

Figure 10:
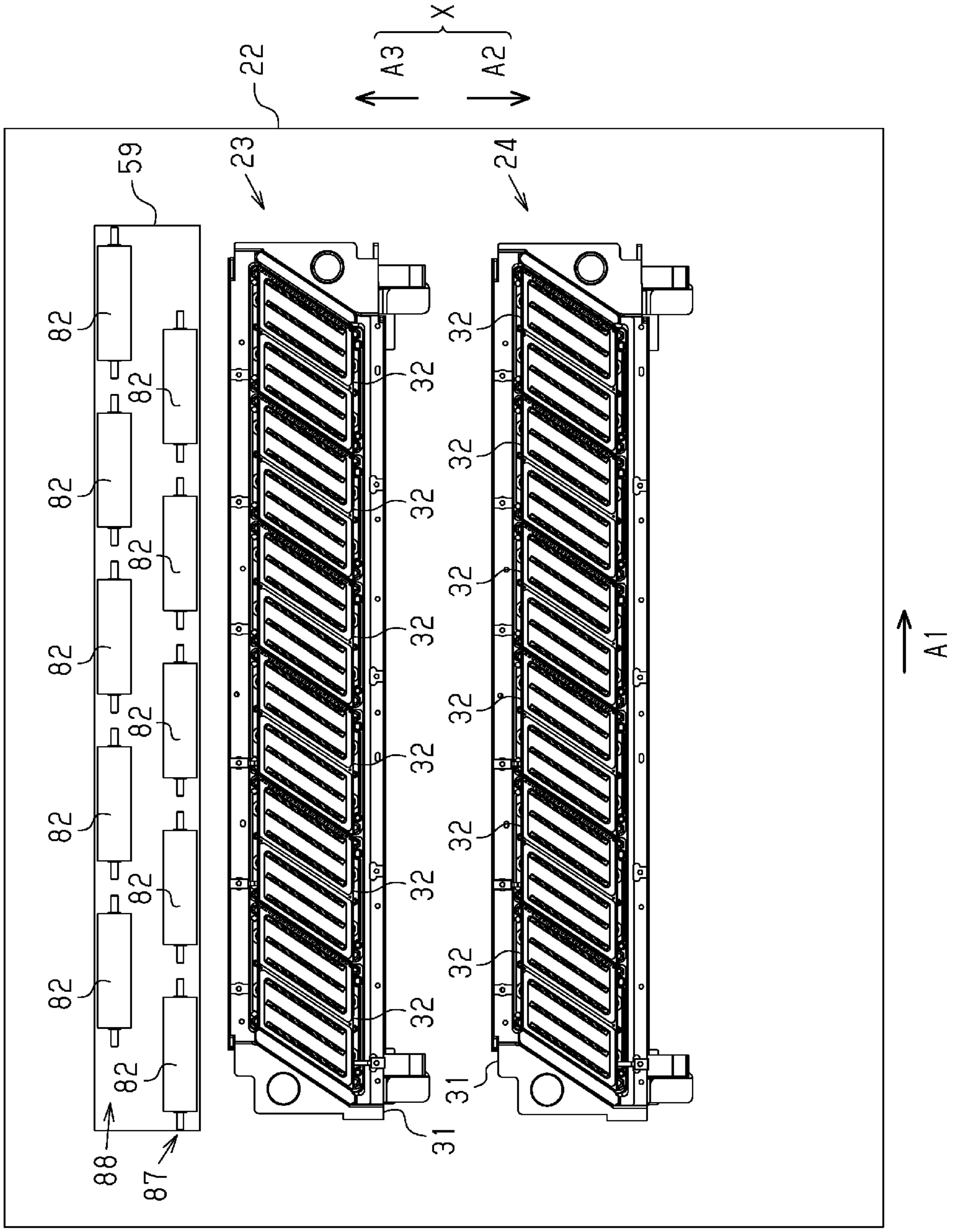
FIG. 10 is a bottom view of a first ejection section just before the wiping section wipes the first ejection section.
Figure 11:
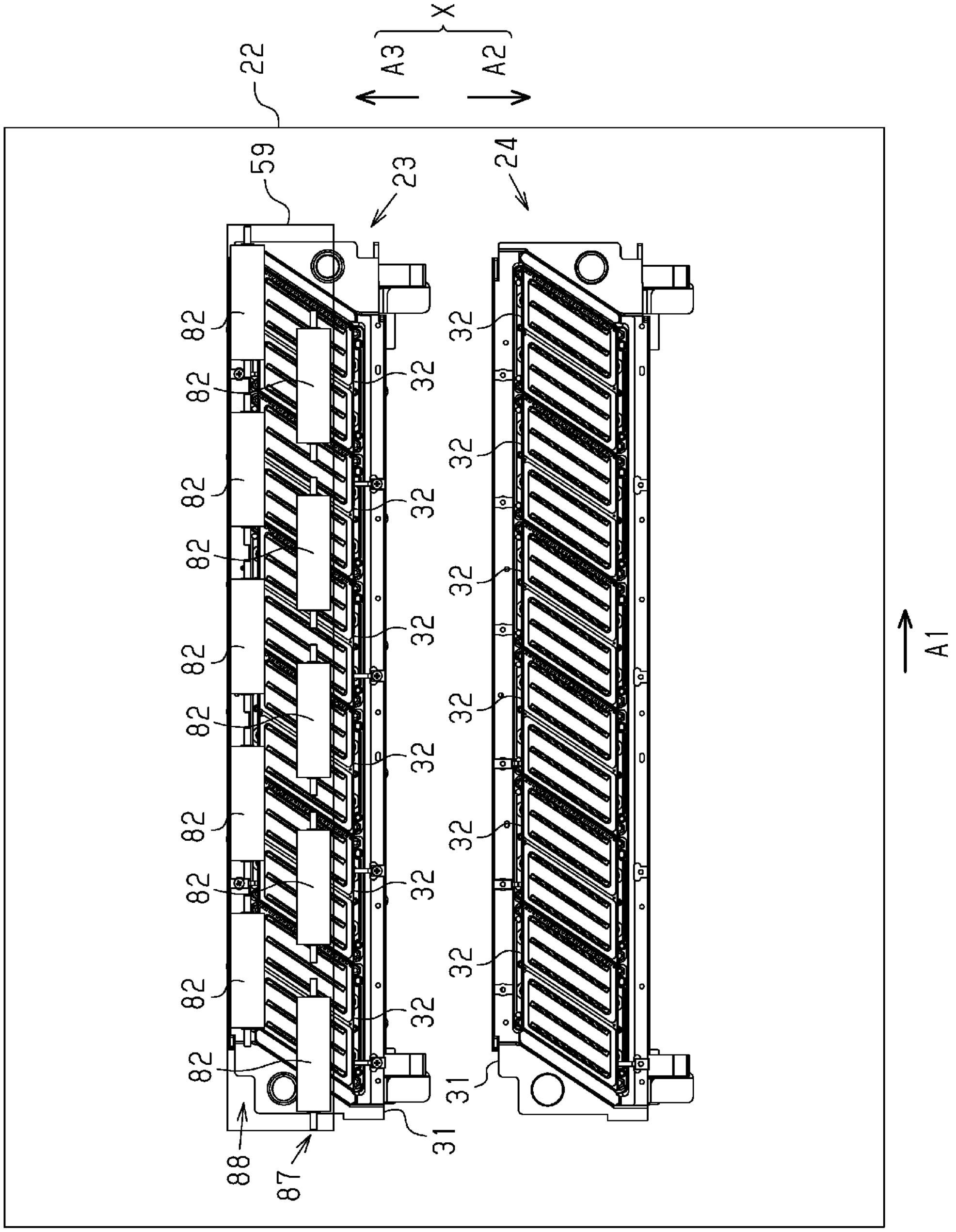
FIG. 11 is a bottom view of the wiping section in the process of wiping the first ejection section.

As shown in FIGS. 10 and 11, the wiping section 48 wipes the multiple nozzle surfaces 25 as the ejection section moves in the third direction A3 with respect to the wiping section 48. First, the upstream pressing body 87 presses the absorbing member 49 against the nozzle surface 25 of the first ejection section 23. Then, the downstream pressing body 88 presses the absorbing member 49 against the nozzle surface 25 of the first ejection section 23. In this way, the multiple nozzle surfaces 25 in the first ejection section 23 are wiped. Next, the upstream pressing body 87 presses the absorbing member 49 against the nozzle surface 25 of the second ejection section 24. Then, the downstream pressing body 88 presses the absorbing member 49 against the nozzle surface 25 of the second ejection section 24. In this way, the multiple nozzle surfaces 25 in the second ejection section 24 are wiped.

4. Operations and Effects

Next, operations and effects of the above-described embodiment will be described.

(1) The wiping section 48 has the multiple pressing members 82 for pressing the absorbing member 49 against the multiple nozzle surfaces 25. The wiping section 48 has the multiple elastic members 90 that press each of the multiple pressing members 82 toward the ejection section. The multiple pressing members 82 include the first pressing body 82A and the second pressing body 82B aligned in the first direction A1.

According to the above configuration, the first pressing member 82A and the second pressing member 82B each press the absorbing member 49 against the multiple nozzle surfaces 25 by different elastic members 90. As a result, the absorbing member 49 can make uniform contact with the plurality nozzle surfaces 25 when there is variation in the heights of the nozzle surfaces 25. Therefore, the wiping section 48 can suitably wipe the multiple nozzle surfaces 25.

(2) The multiple pressing members 82 include the third pressing member 82C. The third pressing member 82C is located, as viewed from the first direction A1, at the position that does not overlap the first pressing member 82A and the second pressing member 82B. At least a part of the third pressing member 82C is located between the first pressing member 82A and the second pressing member 82B as viewed from the second direction A2.

According to the above configuration, the third pressing member 82C can press the absorbing member 49 against the region of the nozzle surface 25 that overlaps the gap between the first pressing member 82A and the second pressing member 82B. Therefore, the wiping section 48 can suitably wipe the multiple nozzle surfaces 25.

(3) The third pressing member 82C is located, as viewed from the second direction A2, overlapping the first pressing member 82A and the second pressing member 82B. According to the above configuration, a portion of the nozzle surface 25 is wiped twice by the first pressing member 82A and the third pressing member 82C. A part of the nozzle surface 25 is wiped twice by the second pressing member 82B and the third pressing member 82C. In this way, the liquid clinging to the nozzle surface 25 is more reliably removed.

(4) The first pressing member 82A has the first cylindrical portion 84A and the first shaft portion 85A. The second pressing member 82B has a second cylindrical portion 84B and a second shaft portion 85B. According to the above configuration, the first pressing member 82A and the second pressing member 82B each have different shaft portions. Therefore, the first cylindrical portion 84A and the second cylindrical portion 84B can tilt at different angles when wiping the multiple nozzle surfaces 25. In this way, the multiple pressing members 82 can easily bring the absorbing member 49 into intimate contact with the multiple nozzle surfaces 25. Therefore, the wiping section 48 can easily wipe away the liquid clinging to the multiple nozzle surfaces 25.

(5) Each of the multiple insertion shafts 80 are inserted into the multiple elastic members 90 and the multiple elastic members 90 are sandwiched between the multiple attachment members 81 and the holding portion 77. According to the above configuration, the elastic member 90 presses the attachment member 81 along the insertion shaft 80 toward the ejection section. Therefore, the posture of the attachment member 81 is easily stabilized. In this way, the wiping section 48 can suitably wipe the multiple nozzle surfaces 25.

(6) The multiple head units 32 each have one or more of the multiple nozzle surfaces 25, and each of the multiple head units is configured to be individually replaceable. The displacement in positions of the multiple head units 32 tends to cause variation in the heights of the nozzle surfaces 25. In this regard, according to the above configuration, the wiping section 48 can suitably wipe the multiple nozzle surfaces 25 when there is variation in the heights of the nozzle surfaces 25.

(7) The wiping section 48 wipes the multiple nozzle surfaces 25 as the carriage 22 moves. According to the above configuration, the wiping section 48 can wipe the multiple nozzle surfaces 25 without moving the wiping section 48.

(8) The liquid ejection device 11 has a movement mechanism 50 that moves the wiping section 48 closer to and away from the ejection section. According to the above configuration, when there is no need to wipe the multiple nozzle surfaces 25, the wiping section 48 is separated from the ejection section. In this way, the possibility of the wiping section 48 needlessly wiping the multiple nozzle surfaces 25 can be reduced.

(9) The cap section 51, the wiping section 48, and the receiving section 43 are aligned in this order in the second direction A2. In the liquid ejection device 11, the ejection section normally ejects liquid toward the receiving section 43, which causes the liquid to cling to the nozzle surface 25. Therefore, it is desirable that the wiping section 48 wipes the nozzle surface 25 after the ejection section ejects liquid toward the receiving section 43. Therefore, according to the above configuration, after the ejection section ejects liquid toward the receiving section 43, the wiping section 48 can wipe the nozzle surface 25 and the capping section 51 can cap it.

5. Modifications

The above embodiments may be modified as follows. The above embodiments and the following modifications can be implemented in combination with each other to the extent that they are not technically contradictory.

The first pressing member 82A and the second pressing member 82B may wipe the entire area of the multiple nozzle surfaces 25.

The first pressing member 82A, the second pressing member 82B, and the third pressing member 82C may wipe the entire area of the multiple nozzle surfaces 25.

The liquid ejected by the first ejection section 23 and the second ejection section 24 is not limited to ink, but can also be, for example, liquid in which particles of functional material are dispersed or mixed in the liquid. For example, the first ejection section 23 and the second ejection section 24 may eject liquid containing materials such as electrode or pixel materials in the form of dispersion or dissolution for use in the manufacture of liquid crystal displays, electroluminescence displays, and surface emitting displays.

6. Technical Ideas

Hereinafter, technical ideas grasped from the above embodiments and modifications, and operations and effects thereof, will be described.

(A) A liquid ejection device includes an ejection section having multiple nozzle surfaces aligned in one direction and configured to eject liquid from nozzles that are opened in each of the multiple nozzle surfaces and a wiping section that wipes the multiple nozzle surfaces, wherein the wiping section has an absorbing member that absorbs the liquid clinging to the multiple nozzle surfaces by contacting the multiple nozzle surfaces, multiple pressing members that press the absorbing member against the multiple nozzle surfaces, and multiple elastic members configured to press each of the multiple pressing members toward the ejection section, wherein the multiple pressing members include a first pressing member and a second pressing member.

According to the above configuration, the first pressing member and the second pressing member each press the absorbing member against the multiple nozzle surfaces by different elastic members. This allows the absorbing member to uniformly contact the multiple nozzle surfaces when there is variation in the height of the nozzle surfaces. Therefore, the wiping section can suitably wipe the multiple nozzle surfaces.

(B) The above liquid ejection device may be configured such that the one direction is a first direction, the multiple pressing members further include a third pressing member, the third pressing member may be located, as viewed from the first direction, in a position where the third pressing member does not overlap the first pressing member and the second pressing member, and as viewed from a second direction that is different from the first direction, at least a part of the third pressing member may be located between the first pressing member and the second pressing member.

A gap is formed in the first direction between the first pressing member and the second pressing member. In the multiple nozzle surfaces, there may be a region that overlaps this gap. The first pressing member and the second pressing member cannot press the absorbing member against the region of the nozzle surface that overlaps this gap. In this regard, according to the above configuration, the third pressing member can press the absorbing member against the region of the nozzle surface that overlaps the gap between the first pressing member and the second pressing member. Therefore, the wiping section can suitably wipe the multiple nozzle surfaces.

(C) The above liquid ejection device may be configured such that the third pressing member is located, as viewed from the second direction, in a position overlapping the first pressing member and overlapping the second pressing member. According to the above configuration, a portion of the nozzle surface is wiped twice by the first pressing member and the third pressing member. A portion of the nozzle surface is wiped twice by the second pressing member and the third pressing member. Thus, the liquid clinging to the nozzle surface is more reliably removed.

(D) The above liquid ejection device may be configured such that the first pressing member has a first cylindrical portion around which the absorbing member is wound and a first shaft portion inserted into the first cylindrical portion and the second pressing member may have a second cylindrical portion around which the absorbing member is wound and a second shaft portion inserted into the second cylindrical portion. According to the above configuration, the first pressing member and the second pressing member each have different shaft portions. Therefore, when wiping the multiple nozzle surfaces, the first cylindrical portion and the second cylindrical portion can tilt at different angles. As a result, the multiple pressing members can easily bring the absorbing members into intimate contact with the multiple nozzle surfaces. Therefore, the wiping section can easily wipe away the liquid clinging to the multiple nozzle surfaces.

(E) The above liquid ejection device described above may be configured such that the wiping section has multiple attachment members to which the multiple pressing members are each attached and a holding member that holds the multiple the attachment members, the holding member has multiple insertion shafts that are inserted into each of the multiple attachment members and a holding portion from which the multiple insertion shafts extend, the multiple attachment members have multiple insertion cylinders into which each of multiple insertion shafts is inserted, and the multiple elastic members may be inserted into each of the multiple insertion shafts, and may be sandwiched between the multiple attachment members and the holding portion, each.

According to the above configuration, the elastic member presses the attachment member along the insertion shaft toward the ejection section. Therefore, the posture of the attachment member is easily stabilized. As a result, the wiping section can suitably wipe the multiple nozzle surfaces.

(F) The above liquid ejection device may be configured such that the ejection section has multiple head units aligned in the one direction and the multiple head units each have one or more of the multiple nozzle surfaces, and each of the multiple head units is configured to be individually replaceable.

If the positions of each of the multiple head units are misaligned, the height of the nozzle surfaces will be likely to vary. In this regard, according to the above configuration, the wiping section can suitably wipe the multiple nozzle surfaces even when there is variation in the height of the nozzle surfaces.

(G) The above liquid ejection device may further include a carriage on which the ejection section is mounted, and the wiping section may wipe the multiple nozzle surfaces as the carriage moves. According to the above configuration, the wiping section can wipe the nozzle surface without moving the wiping section.

(H) The above liquid ejection device may have a movement mechanism that is configured to move the wiping section closer to or away from the ejection section. According to the above configuration, when there is no need to wipe the multiple nozzle surfaces, the wiping section is separated from the ejection section. Thus, the possibility of the wiping section needlessly wiping the multiple nozzle surfaces can be reduced.

(I) The above liquid ejection device may have a cap section that forms a space connecting to the nozzles by contacting the ejection section, and a receiving section that receives liquid ejected from the nozzles, wherein the one direction is a first direction, the cap section, the wiping section, and the receiving section may be aligned in this order in a second direction that differs from the first direction.

In the liquid ejection device, the ejection section normally ejects liquid toward the receiving section, which causes the liquid to cling to the nozzle surface. Therefore, it is desirable that the wiping section wipes the nozzle surface after the ejection section ejects liquid toward the receiving section. Therefore, according to the above configuration, after the ejection section ejects liquid toward the receiving section, the wiping section can wipe the nozzle surface and the capping section can cap it.

What is claimed is:

1. A liquid ejection device comprising:

an ejection section having multiple nozzle surfaces aligned in one direction perpendicular to a medium transport direction and configured to eject liquid from nozzles that are opened in each of the multiple nozzle surfaces; and a wiping section that wipes the multiple nozzle surfaces, wherein the wiping section has an absorbing member that absorbs the liquid clinging to the multiple nozzle surfaces by contacting the multiple nozzle surfaces, multiple pressing members that press the absorbing member against the multiple nozzle surfaces and include a first pressing member and a second pressing member aligned in the one direction, and multiple elastic members that press each of the multiple pressing members toward the ejection section.

2. The liquid ejection device according to claim 1, wherein the one direction is a first direction, the multiple pressing members further include a third pressing member, the third pressing member is located, as viewed from the first direction, in a position where the third pressing member does not overlap the first pressing member and the second pressing member, and as viewed from a second direction that is different from the first direction, at least a part of the third pressing member is located between the first pressing member and the second pressing member.

3. The liquid ejection device according to claim 2, wherein the third pressing member is located, as viewed from the second direction, in a position overlapping the first pressing member and overlapping the second pressing member.

4. The liquid ejection device according to claim 1, wherein the first pressing member has a first cylindrical portion around which the absorbing member is wound and a first shaft portion inserted into the first cylindrical portion and the second pressing member has a second cylindrical portion around which the absorbing member is wound and a second shaft portion inserted into the second cylindrical portion.

5. The liquid ejection device according to claim 1, wherein the wiping section has multiple attachment members to which the multiple pressing members are each attached and a holding member that holds the multiple attachment members, the holding member has multiple insertion shafts that are inserted into each of the multiple attachment members and a holding portion from which the multiple insertion shafts extend, the multiple attachment members have multiple insertion cylinders into which each of multiple insertion shafts is inserted, and the multiple insertion shafts are each inserted into the multiple elastic members, and the multiple elastic members are sandwiched between the multiple attachment members and the holding portion.

6. The liquid ejection device according to claim 1, wherein the ejection section has multiple head units aligned in the one direction and the multiple head units each have one or more of the multiple nozzle surfaces, and each of the multiple head units is configured to be individually replaceable.

7. The liquid ejection device according to claim 1, further comprising:

a carriage on which the ejection section is mounted, wherein the wiping section wipes the multiple nozzle surfaces as the carriage moves.

8. The liquid ejection device according to claim 7, further comprising:

a moving mechanism configured to move the wiping section closer to or away from the ejection section.

9. The liquid ejection device according to claim 7, further comprising:

a cap section that forms a space connecting to the nozzles by contacting the ejection section, and a receiving section that receives liquid ejected from the nozzles, wherein the one direction is a first direction, the cap section, the wiping section, and the receiving section are aligned in this order in a second direction that differs from the first direction.

* * * * *